May 5, 1964

R. HOCHSCHILD 3,132,299

ELECTROMAGNETIC-TESTING BRIDGE-NETWORK WITH DIGITAL
PROGRAMMING CONTROL FOR OPERATION UNDER A
PLURALITY OF INITIAL UNBALANCE CONDITIONS
Filed Oct. 17, 1960

INVENTOR.
Richard Hochschild
BY
ATTORNEY

United States Patent Office 3,132,299
Patented May 5, 1964

3,132,299
ELECTROMAGNETIC-TESTING BRIDGE-NETWORK WITH DIGITAL PROGRAMMING CONTROL FOR OPERATION UNDER A PLURALITY OF INITIAL UNBALANCE CONDITIONS
Richard Hochschild, Ardmore, Pa., assignor to The Budd Company, Philadelphia, Pa., a corporation of Pennsylvania
Filed Oct. 17, 1960, Ser. No. 63,123
4 Claims. (Cl. 324—34)

This invention pertains to a bridge network for use in electromagnetic testing and, more particularly, to an unbalanced bridge network adapted for electromagnetic testing operations at a series of initial phase unbalance conditions of substantially equal amplitude.

When excited by an oscillating input and electromagnetically coupled with a metallic workpiece, the impedance and the reactance of a test coil are affected by variations in the properties of the workpiece. These variations may be detected to provide information concerning deviations in the properties of a sample workpiece from standard properties. In many applications, it is convenient to employ two test coils, one coupled with a standard workpiece and the other coupled with a sample workpiece, as adjacent arms of a four-arm bridge network. The other arms of the bridge, the ratio arms, usually comprise variable impedances. The bridge is excited by an oscillator connected across one diagonal, and the output to an indicator or to a utilization circuit is taken across the other diagonal.

Generally, the electromagnetic bridge network is balanced initially for equal test coil arm impedance values. A sample workpiece is then moved through the field of one of the test coils and the bridge output variation is detected as an indication of workpiece properties.

The initially balanced bridge is considerably affected by ambient conditions such as temperature and must be periodically rebalanced to correct for drift and the like. Balancing requires that resistive and reactive impedances of the ratio arms are alternately adjusted and, since adjustment of one affects the other, readjusted a number of times depending upon the precision of the bridge application.

As an alternative, the bridge impedances may be chosen to provide an initial unbalance and a non-zero normal output against which sample workpiece effects are compared. The initial unbalance may be due to resistive or reactive impedance differences or both and, therefore, it has both a characteristic amplitude and a characteristic phase angle. Since sensitivity of electromagnetic testing is selectively enhanced for certain types of workpiece variations by proper choice of the unbalance phase angle, it is often desirable that a given initial unbalance amplitude be repeated at several phase angle settings. Ordinarily, this entails considerable readjustment of the impedance elements comprising the bridge ratio arms.

Excitation frequency which determines penetration of the test coil-workpiece coupling allowing depth differentiation of workpiece variations is an additional factor affecting initial settings. A change in excitation frequency ordinarily alters both the magnitude and the phase of an unbalance condition further complicating initial adjustment of the ratio arm impedances and reactances.

Therefore, it is a general object of this invention to provide an improved bridge network which reduces to a minimum the operations required for setting initial parameters.

A specific object is to provide a bridge network for electromagnetic testing at a plurality of initial phase unbalance conditions of substantially equal unbalance amplitude as predetermined by a minimum number of discrete changes of ratio arm impedances.

A further specific object is to provide a bridge network for electromagnetic testing which has a plurality of initial phase unbalance conditions of substantially equal amplitude at widely separated excitation frequencies, as predetermined by discrete adjustments of ratio arm impedances.

In accordance with this invention, an illustrated bridge network particularly for electromagnetic testing at a plurality $n$ of unbalance positions $i=1$ to $i=n$ of equal unbalance amplitude $|Z|$ and selective phase unbalance $\phi_i$, comprises: first and second adjacent test arms; first and second adjacent ratio arms; an input diagonal; an output diagonal; and a digital programming means including a first circuit connecting the first ratio arm with a first of said diagonals, a second circuit connecting the second ratio arm with the first diagonal, a plurality of resistive impedances $R_i = |Z| \cos \phi_i$ and a plurality of reactive impedances $X_i = |Z| \sin \phi_i$, and a switch means having a plurality of positions $i=1$ to $i=n$ respectively inserting positive impedances $R_i$, $X_i$ serially in said first circuit and negative impedances $R_i$, $X_i$ serially in said second circuit at each corresponding switch position $i$, whereby analog bridge adjustments are obviated.

For a better understanding of the present invention, together with additional objects and advantages thereof, reference should be had to the following description taken in conjunction with the accompanying drawing wherein.

Figure 1:
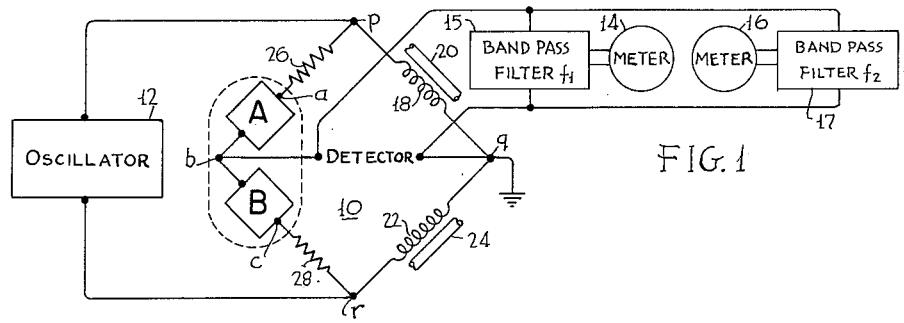
FIG. 1 is an elementary diagram of a bridge network arm $bp$ comprises a fixed resistor 26 and a variable im-cording to this invention.

The bridge network 10 illustrated in FIG. 1 is conventional in that it comprises two ratio arms, $bp$ and $br$; two test arms, $qp$ and $qr$; a first diagonal, the circuit coupling intersections $p$ and $r$; and a second diagonal, the circuit connecting intersections $b$ and $q$. Interchangeably, a bridge excitation input oscillator 12 is connected between $p$ and $r$ and bridge output detector means 14 and 16 are connected between terminals $b$ and $q$.

As adapted for electromagnetic testing, test arm $qp$ may comprise a standard test coil 18 electromagnetically coupled with a standard workpiece 20 and test arm $qr$ may comprise a duplicate test coil 22 to be coupled with a sample, or unknown, workpiece 24 for electromagnetic comparison with the standard workpiece 20. Ratio arm $bp$ comprises a fixed resistor 26 and a variable impedance represented by block A; similarly, ratio arm $br$ comprises a fixed resistor 28 and a variable impedance represented by block B. The impedances of resistors 26 and 28 are equal resistances with no significant reactive components. If the characteristic impedances of test coils 18 and 22 are made equal when workpieces 20 and 24 are identical and blocks A and B are shunted, the bridge 10 is balanced and no bridge output is detectable. When properties of the sample workpiece 24 differ from those of standard workpiece 20, the net impedance of sample test coil 22 is altered, the bridge is unbalanced, and an output is detectable. The output signal may be variously treated, as by parallel high and low band pass filter channels 15 and 17 and its amplitude displayed by meters 14 and 16, A.C. volt meters, for example.

In order to increase bridge sensitivity, an initial bridge condition of known unbalance amplitude and phase angle may be employed. Here, phase angle $\phi$ is defined as: $\phi = \tan^{-1}(X/R)$; where X is the reactive component and R the resistive component of the initial vector difference between unequal impedances of the bridge ratio arms. Initial phase unbalance enhances output amplitude detection of those workpiece parameters whose variations would cause a similar phase unbalance of a balanced bridge.

In the past, the common practice has been to include continuously variable impedances in the bridge ratio arms $bp$ and $br$, and to make continuous, analog, adjustments during selection of initial bridge conditions. These interdependent, time consuming adjustments were repeated whenever initial conditions were changed or when bridge impedances changed due to ambient effects. According to this invention, however, discrete unbalance phase angle changes are programmed digitally by selective insertion of fixed impedances in the bridge ratio arms. The insertions are made at A, serially between terminals $b$ and $a$ or at B, serially between terminals $b$ and $c$, depending upon the quadrant of the required unbalance phase angle.

Figure 2:
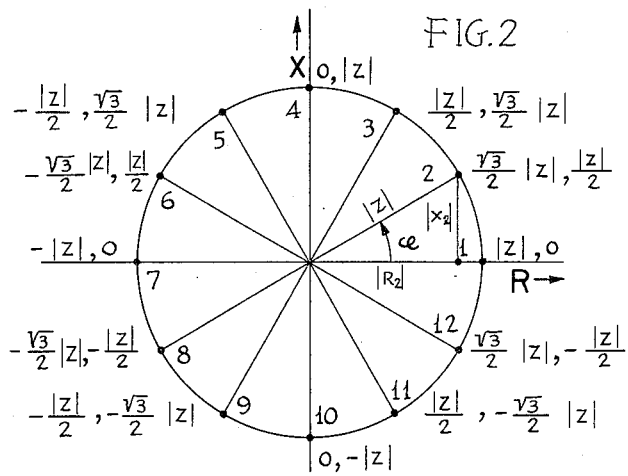
FIG. 2 is a polar diagram of related resistive and reactive impedances which determine certain phase unbalance conditions upon their series insertion in the ratio arms of the FIG. 1 bridge network.

The polar diagram of FIG. 2 illustrates relationships between phase angles $\phi_i$, and the reactances $X_i$, and the resistances $R_i$, serially insertable at A to produce an unbalance amplitude $|Z|$ at several phase positions, assuming B to represent a shunt. The sign convention is for the case where the vector impedance of ratio arm $br$ is subtracted from the vector impedance of ratio arm $pb$. In this example, phase positions 1 to 12 are plotted for successive phase angle increments of 30° measured counter-clockwise from the positive R direction. The respective impedances are related by: $R_i = |Z| \cos \phi_i$ and $$X_i = |Z| \sin \phi_i$$

According to the above assumptions, negative impedances would be required at some phase positions. However, addition of a positive quantity to the subtrahend in a subtraction is equivalent to addition of a negative quantity to the minuend. Therefore, the effect of a negative impedance insertion in ratio arm $bp$ is realized by insertion of a positive impedance of the same absolute value in ratio arm $br$. For example, since second quadrant phase position 5 indicates insertion of resistance $$R_5 = -.5|Z|$$

and reactance $X_5 = +.866|Z|$ in ratio arm $pb$, the unbalance condition is achieved by insertion of the indicated reactance in ratio arm $bp$ and the indicated resistance in ratio arm $br$.

In addition to phase sensitivity, the electromagnetic testing art recognizes frequency sensitivity as a further important factor in the resolution of workpiece parameters. The penetration of the electromagnetic coupling between test coil and workpiece is an inverse function of excitation frequency. For example, workpiece surface defects are magnified at high excitation frequencies while internal defects are magnified at low excitation frequencies. By the use of a variable or dual frequency oscillator, and high and low band pass filters in parallel output channels, high frequency and low frequency workpiece investigations may be carried on selectively.

Since the impedances of reactive bridge components are a function of frequency, however, excitation frequency changes have generally required considerable analog rebalancing adjustment of the variable ratio arm impedances of conventional bridge circuits and would seem to obviate digital programming of the variable-phase unbalanced bridge circuits.

According to an embodiment of this invention, however, ratio arm reactance is restricted to insertable impedances which each comprise a series combination of capacitance and inductance so related as to yield substantially equal magnitude reactances at two widely separated excitation frequencies. An additional advantage of this improvement is that it allows simultaneous dual frequency operation.

For any two frequencies $f_1$ and $f_2$, the requirement that the reactance of a series combination of a capacitance $C_i$ and an inductance $L_i$ is equal to $X_i$ at both frequencies, may be stated as:

$$|X_i| = 2\pi f_1 |L_i| - \tfrac{1}{2}\pi f_1 |C_i|$$

and $$|X_i| = 2\pi f_2 |L_i| - \tfrac{1}{2}\pi f_2 |C_i|$$

These simultaneous conditions are satisfied uniquely when:

$$\begin{array}{l} |L_i| = |X_i|/2\pi(f_1+f_2); \text{ and} \\ |C_i| = (f_1+f_2)/2\pi f_1 f_2 |X_i| \end{array} \quad (I)$$

At the higher frequency $f_2$, the inductive reactance $|L_i|$ exceeds the corresponding capacitive reactance $|C_i|$ and the phase relationships of FIG. 2 hold as diagrammed. At the lower frequency $f_1$, the capacitive reactance exceeds the inductive reactance and the phase positions are rotated 180° from those indicated in the diagram. There is, however, no change in the magnitude of the initial unbalance of the bridge network, and the frequency characterized unbalance vectors are parallel.

The following table illustrates, as an example, insertion impedances calculated according to the polar diagram of FIG. 2 and equations I above for frequencies $f_1 = 4$kc. and $f_2 = 64$kc. to yield a specific unbalance amplitude $|Z| = 75$ ohms at each of the indicated phase positions. The impedances required for production of the positive reactances of FIG. 2 are to be inserted at A between $b$ and $a$ in the ratio arm $bp$ of the FIG. 1 bridge network; those required for production of the negative reactances are to be inserted at B between $b$ and $c$ in ratio arm $br$. In the absence of an insertion impedance, terminals $a$ and $b$ or $b$ and $c$ are shorted together by a shunt at A or at B. Negligible shunt resistance or reaction is indicated by dashes (– – – –).

*Table I*

| Phase position | | Impedance inserted at A | | | Impedance inserted at B | | |
|---|---|---|---|---|---|---|---|
| Pos. | $\phi_i$, degrees | $R_i$ (ohms) | $L_i$ ($\mu$h.) | $C_i$ ($\mu$f.) | $R_i$ (ohms) | $L_i$ ($\mu$h.) | $C_i$ ($\mu$f.) |
| 1 | 0 | 75.0 | – – – – | – – – – | – – – – | – – – – | – – – – |
| 2 | 30 | 65.0 | 87.6 | 1.12 | – – – – | – – – – | – – – – |
| 3 | 60 | 37.5 | 152 | .650 | – – – – | – – – – | – – – – |
| 4 | 90 | – – – – | 175 | .563 | – – – – | – – – – | – – – – |
| 5 | 120 | – – – – | 152 | .650 | 37.5 | – – – – | – – – – |
| 6 | 150 | – – – – | 87.6 | 1.12 | 65.0 | – – – – | – – – – |
| 7 | 180 | – – – – | – – – – | – – – – | 75.0 | – – – – | – – – – |
| 8 | 210 | – – – – | – – – – | – – – – | 65.0 | 87.6 | 1.12 |
| 9 | 240 | – – – – | – – – – | – – – – | 37.5 | 152 | .650 |
| 10 | 270 | – – – – | – – – – | – – – – | – – – – | 175 | .563 |
| 11 | 300 | 37.5 | – – – – | – – – – | – – – – | 152 | .650 |
| 12 | 330 | 65.0 | – – – – | – – – – | – – – – | 87.6 | 1.12 |

Figure 3:
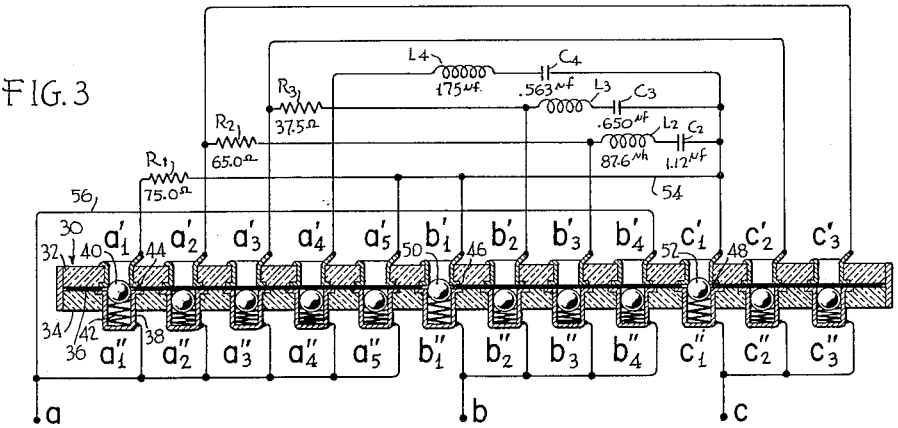
FIG. 3 illustrates a preferred digital programming means for the insertion of the FIG. 2 impedances in the bridge network of FIG. 1.

A digital programming means for instrumenting the relationships of Table I is illustrated in FIG. 3 in a preferred form incorporating a minimum number of impedance elements. A punched card operated switch 30, shown in cross section, comprises upper and lower platens 32 and 34 of insulating material spaced apart to allow insertion of a punched card 36 therebetween. Contact grommets $a'$, $b'$ and $c'$ are fixed in upper platen 32 and indexed over corresponding spherical bearing contacts $a''$, $b''$ and $c''$ fixed in lower platen 34. Each spherical bearing contact, $a_1''$ for example, comprises a contact cup 38, a spherical bearing 40 and a spring 42, urging bearing 40 upward and into contact with the corresponding upper platen contact grommet, e.g., $a_1'$. In the usual manner, insertion of a blank punched card between platens 32 and 34 depresses the spherical bearings 40 effectively open-circuiting each contact pair. However, if a specific punched card 36 has been perforated to define holes as at 44, 46, 48 which are aligned between contact halves at an insertion position, corresponding bearings 40, 50 and 52 protrude and make electrical connection between the respective upper and lower platen contacts.

In this example, contacts $a''$ are connected to terminal $a$ of ratio arm $bp$ in the FIG. 1 bridge, contacts $b''$ are connected with diagonal terminal $b$, and contacts $c''$ are connected with terminal $c$ of ratio arm $br$. Therefore, connection of an impedance element between a contact $a'$ and a contact $b'$, when the $a'$ contact is connected with a contact $a''$ and the $b'$ contact is connected with a contact $b''$, is equivalent to insertion of that impedance at A in ratio arm $bp$ between terminals $b$ and $a$. A similar analogy may be made for insertions at B.

Reference to FIG. 2 or to Table I will confirm that determination of twelve phase positions requires but three insertion resistance magnitudes ($R_1=|Z|$, $R_2=.866|Z|$, $R_3=.500|Z|$) and three insertion reactance magnitudes ($X_2=.500|Z|$, $X_3=.866|Z|$, $X_4=|Z|$), together with zero-impedance shunts. For excitation frequency considerations, however, each of the reactive impedances is derived from a series combination of an inductor and a capacitor, $L_2$–$C_2$, $L_3$–$C_3$, $L_4$–$C_4$, respectively.

Figure 4:
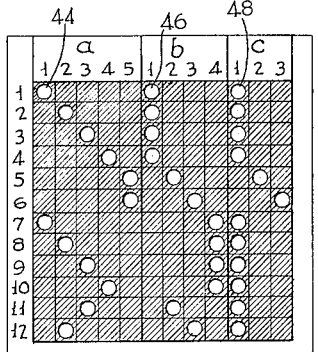
FIG. 4 illustrates a punched card for use with the digital programming means of FIG. 3.

These required impedances may be connected in the upper platen network of FIG. 3 as illustrated, and correlated with the punched card program illustrated in FIG. 4.

The contacts $a_1$, $b_1$ and $c_1$ indicated as closed in FIG. 3 set up a first phase position $\phi_1$. This is accomplished when punched card 36 is inserted in punched card switch 30 with row 1 at the operative position. Resistance $R_1=75$ ohms is then effectively inserted at position A between terminals $b$ and $a$ with terminals $b$ and $c$ shorted together by conductor 54.

When punched card 36 is positioned to align its row 2 with the contacts of switch 30, holes $a_2$, $b_1$ and $c_1$ allow contact pairs $a_1'$ and $a_1''$, $b_1'$ and $b_1''$, $c_1'$ and $c_1''$ to be closed, while the other contact pairs are opened. The series impedances $R_2=65$ ohms, $L_2=87.6$ $\mu$h., and $C_2=1.12$ $\mu$f. are then effectively inserted at position A between terminals $b$ and $a$, since terminals $b$ and $c$ are shorted together via closed contact $c_1$, conductor 54, and closed contact $b_1$.

Programming of any other selected phase position is accomplished by insertion of the punched card 36 so that the proper row of punch positions is aligned with the contacts of switch 30. Description of one further example, however, may be advantageous for illustration of phase reversal. Selection of phase position 8, the opposite of phase position 2 explained above, requires that the impedances $R_2$, $L_2$ and $C_2$ now be serially inserted at B, instead of at A. Row 8, containing perforations at $a_2$, $b_4$, and $c_1$, is therefore aligned with the switch contacts and terminals $a$ and $b$ are then shorted together via conductor 56 and closed contact $b_4$. Simultaneously, impedances $R_2$, $L_2$, and $C_2$ are serially inserted between terminals $b$ and $c$ via closed contact $a_2$, conductor 56 and closed contact $b_4$.

Other equivalent digital programming means may be substituted for the punched card system. For example, an array of single-pole, single-throw switches may be substituted in the same circuit positions as the contact pairs of switch 30 and individually opened or closed according to the program of FIG. 4. Alternatively, a single-pole, multi-position rotary switch may replace each group of similarly lettered switch contacts.

Although the above description discloses the invention as applied to a bridge network for electromagnetic testing, it is to be understood that the invention may be employed wherever digital programming of an impedance bridge network is required. Further, it will be obvious to those skilled in the art that various modifications may be made in the preferred embodiments without departing from the invention. For example, where bridge excitation is restricted to a single narrow frequency band, reactive impedances need not be composed of the specifically related inductive and capacitive components. Therefore, it is aimed in the appended claims to cover all such changes and modifications as fall within the true spirit and scope of the invention.

What is claimed is

1. In combination with a bridge network for electromagnetic testing under a plurality $n$ of initial unbalance conditions $i$ of equal amplitude $|Z|$ and predetermined different phase angles $\phi_i$, with $i$ being an integer from 1 to $n$, a digital programming control including first, second, and third junctions, a plurality of resistive impedances $R_i=|Z \cos \phi_i|$ and a plurality of reactive impedances $X_i=|Z \sin \phi_i|$, zero values of $R_i$ and $X_i$ being comprised by shunts, and a multi-component switch means connected to said junctions and impedances having a plurality $n$ of discreet switch positions $i=1$ to $i=n$, said switch means at each position $i$ connecting respective impedances $R_i$ and $X_i$ between said first and second junctions when the resistive values of $\cos \phi_i$ and $\sin \phi_i$ are positive and between said first and third junctions when said values are negative, said control being adapted for connection with a bridge network defining a first arm extending from said first junction to a fourth junction, a second arm extending from said fourth junction to a fifth junction, a third arm extending from said fifth junction to a sixth junction, a fourth arm extending from said sixth junction to said third junction, and input oscillator and output utilization means individually connected between said second and fifth junctions, and between said fourth and sixth junctions, two of said arms being comprised of similar resistive impedances and two of said arms being comprised of electromagnetic testing coil means whose relative impedances vary with parameters of a workpiece operatively coupled with at least one of said coil means.

2. The combination of claim 1 wherein each non-zero reactive impedance $X_i$ is comprised serially by an inductive impedance $L_i=X_i/2\pi(f_1+f_2)$ and a capacitive impedance $C_i=(f_1+f_2)/2\pi f_1 f_2 X_i$, $f_1$ and $f_2$ being two different frequencies selectively produced by the bridge network input oscillator means.

3. The electromagnetic testing bridge network of claim 1 wherein the said unbalance amplitude $|Z|$ is greater than a predetermined maximum unbalance amplitude due to ambient condition variations.

4. The bridge network of claim 3 in which said switch means comprises the combination of a punched card responsive switch and a programmed punch card.

References Cited in the file of this patent

UNITED STATES PATENTS

| | | |
|---|---|---|
| 2,903,529 | Hanthorn | Sept. 8, 1959 |
| 2,911,588 | Wetherhold | Nov. 3, 1959 |

OTHER REFERENCES

Clark et al.: Proceedings of the Insititute of Electrical Engineers, May 1949, part III; pp. 189–202.

UNITED STATES PATENT OFFICE
CERTIFICATE OF CORRECTION

Patent No. 3,132,299                         May 5, 1964

Richard Hochschild

It is hereby certified that error appears in the above numbered patent requiring correction and that the said Letters Patent should read as corrected below.

Column 2, line 31, for "arm bp comprises a fixed resistor 26 and a variable im-" read -- including a functional representation of its adaption ac- --; column 6, line 36, for "resistive" read -- respective --.

Signed and sealed this 27th day of October 1964.

(SEAL)
Attest:

ERNEST W. SWIDER                               EDWARD J. BRENNER
Attesting Officer                                      Commissioner of Patents